United States Patent Office 3,204,035
Patented Aug. 31, 1965

3,204,035
ORTHONORMAL PULSE MULTIPLEX TRANSMISSION SYSTEMS
Arthur H. Ballard, 5803 Osceola Road, Bethesda, Md., and Bernard R. Boymel, 5730 26th St. NW., Washington 15, D.C.
Filed Nov. 26, 1962, Ser. No. 239,928
18 Claims. (Cl. 179—15)

This invention relates to systems for transmitting and receiving multiple channels of information signals over a single electrical or electromagnetic link. When not limited thereto, the information signals may consist of voice, music, telegraphy, telephoto, telemetering, remote control, or other signals.

Previously descibed multiplex transmission systems have employed sine wave carriers separated in frequency, rectangular pulse carriers separated in time, or combinations thereof, to carry various information channels on a single transmission link in a form which permits the channels to be separated again without mutual interference. In the case of sine wave carriers, information has been conveyed by modulating the amplitude, frequency, or phase of the basic sine waves. In the case of time-separated pulse carriers, information has been conveyed by modulating the amplitude, duration, position or group coding of the carrier pulses.

The use of sine wave carriers has the disadvantage that either a separate oscillator must be provided for each channel, or extremely complex equipment must be employed to generate harmonically related sine waves from a single oscillator. A further disadvantage is the inefficient utilization of bandwidth usually associated with sine wave carriers which results from the excessive frequency spacing between carriers needed in order that they can be separated without interference by resonant filter networks of practical design. Still another disadvantage is that the filter networks needed for channel separation often require the use of bulky components such as iron core inductors, which results in an equipment of excessive size and weight.

The use of time-separated pulse carriers, on the other hand, has the disadvantage that complicated and frequently unreliable synchronizing equipment is needed to combine and separate the carrier pulses at proper instants of time. Related to this disadvantage is the ever-present hazard that improper synchronization will result in cross-connection of channels. A further disadvantage of conventional pulse carrier systems is their lack of flexibility in increasing or decreasing the number of channels without major equipment changes.

In co-pending application No. 190,294, the inventors have described an improved multiplex transmission method which obviates these limitations by the use of orthogonal polynomial carrier signals. The present invention uses orthonormal pulse waveforms, which is a further improvement in that the equipment needed for waveform generation and detection is further simplified. As another advantage over the orthogonal polynomial waveforms, the orthonormal pulse waveforms permit equal amplitude scaling for equal power, and requires less dynamic range for a given power level.

The orthonormal pulse waveforms of this invention are transmitted simultaneously and continuously without interruption. In this sense, they differ from conventional pulse carriers which are never allowed to overlap in time. All of the orthonormal pulse waveforms may have the same duration and repetition period, which simplifies the synchronization problem and permits the number of channels to be varied in a flexible manner. The latter characteristics also apply to sine wave carriers, but the ortho- normal pulse carriers have the advantage that they require simpler and less costly equipment for their generation and detection.

It is the orthonormal property of the new carrier waveforms which permits them to be separated simply without interaction. The term orthonormal is defined herein as the collective property of a set of time-dependent waveforms, such that the average product of any two different waveforms in the set is zero, while the average product of any individual waveform in the set times itself is unity. Thus if $P_n(t)$ and $P_m(t)$ are any two waveforms of an orthonormal set having a common repetition period T, the following relation must be true:

$$\frac{1}{T}\int_0^T P_n(t)P_m(t)dt = \begin{cases} 0, & m \neq n \\ 1, & m = n \end{cases}$$

In applying orthonormal waveforms to a multiplex transmission system, the transmitting terminal is arranged so that each carrier waveform is modulated in amplitude by an independent information signal. The modulated carriers are then summed to form a composite signal for transmission having the form:

$$E(t) = \sum_0^N a_n P_n(t), \ 0 \leq t \leq T$$

In this equation, the coefficients $a_n$ represent the modulating information signals, which are caused to be essentially constant during each repetition period T.

At the receiving terminal, each information signal is recovered by a correlation process specified by the equation:

$$a_m = \frac{1}{T}\int_0^T E(t)P_m(t)dt$$

Thus each channel is separated and its modulating information recovered, by multiplying the composite signal by the carrier waveform for that channel and integrating the product over each period T.

Each information signal is recovered without interaction, as may be verified by replacing $E(t)$ in the last equation with its value in the previous equation. The orthonormal property of the carrier waveforms causes all products of unequal subscripts $a_n P_n(t) P_m(t)$ to integrate to zero. The product having equal subscripts $$a_m P_m(t) P_m(t)$$

integrates to the value $a_m$, which is the amplitude of the desired information signal for the period T.

The correlation process just described is optimum not only for eliminating cross-talk between channels of a multiplex system but is also optimum for rejecting random noise in each recovered information channel. A proof that correlation maximizes signal-to-noise ratio may be found for example in Random Signals and Noise, W. B. Davenport and W. L. Root, McGraw-Hill, 1958, pages 343–345. A further conclusion which may be drawn from this book is that a correlation detector has a effective noise bandwidth of only $\frac{1}{2}T$ cycles per second; that is, one half the reciprocal of the integrating period. This bandwidth can be made quite small merely by adjusting the period T. Effective bandwidth is not dependent upon the use of critical or costly resonant filters.

There are many possible sets of orthonormal waveforms which might be employed as carriers in a multiplex system. This invention relates to the use of rectangular, overlapping, orthonormal pulse waveforms which are preferred because of the simplicity of the equipment needed for their implementation.

It is one object of the present invention to provide a new class of multiplex transmission systems employing rectangular, overlapping, orthonormal pulse waveforms as carrier signals, in order that many channels of electrical information can be combined on a single transmission link and separated again without interference.

Another object of the present invention is to provide a class of mutiplex transmission systems in which all channels share the same frequency spectrum and time duration in an efficient manner.

A further object of the present invention is to provide a class of multiplex transmission systems in which all channels provide equal amounts or rejection to random internal or external noise, such rejection being considerably higher than that exhibited by previous transmission systems.

Still another object of the present invention is to provide a class of mutiplex transmission systems in which all channels are readily adaptable to proportional analog, as well as discrete digital modulation, the analog modulation being automatically calibrated, and being capable of either positive or negative excursions about a zero level, the zero level being automatically produced at the receiver in the event of signal interruption.

A still further object of the present invention is to provide a class of multiplex transmission systems in which the number of channels can be easily increased or decreased by adding or subtracting small amounts of equipment with little or no effect on the other channels.

Still another object of the present invention is to provide a class of multiplex transmission systems in which the various channels can be adapted for different rates of information response, at the same time maintaining efficient utilization of frequency spectrum and time duration.

A still further object of the present invention is to provide a class of multiplex transmission systems in which all channels are synchronized by a single oscillator, and in which the receiver is automatically and simply synchronized to the transmitter without danger of channel cross-connection.

Still another object of the present invention is to provide a class of multiplex transmission systems which are readily adaptable to small, lightweight, reliable construction using only solid-state components such as transistors, diodes, resistors and capacitors.

Other objects and attendant advantages of this invention will be readily appreciated as the same become better understood by reference to the following detailed discussion in connection with the accompanying drawings, wherein.

Figure 2:
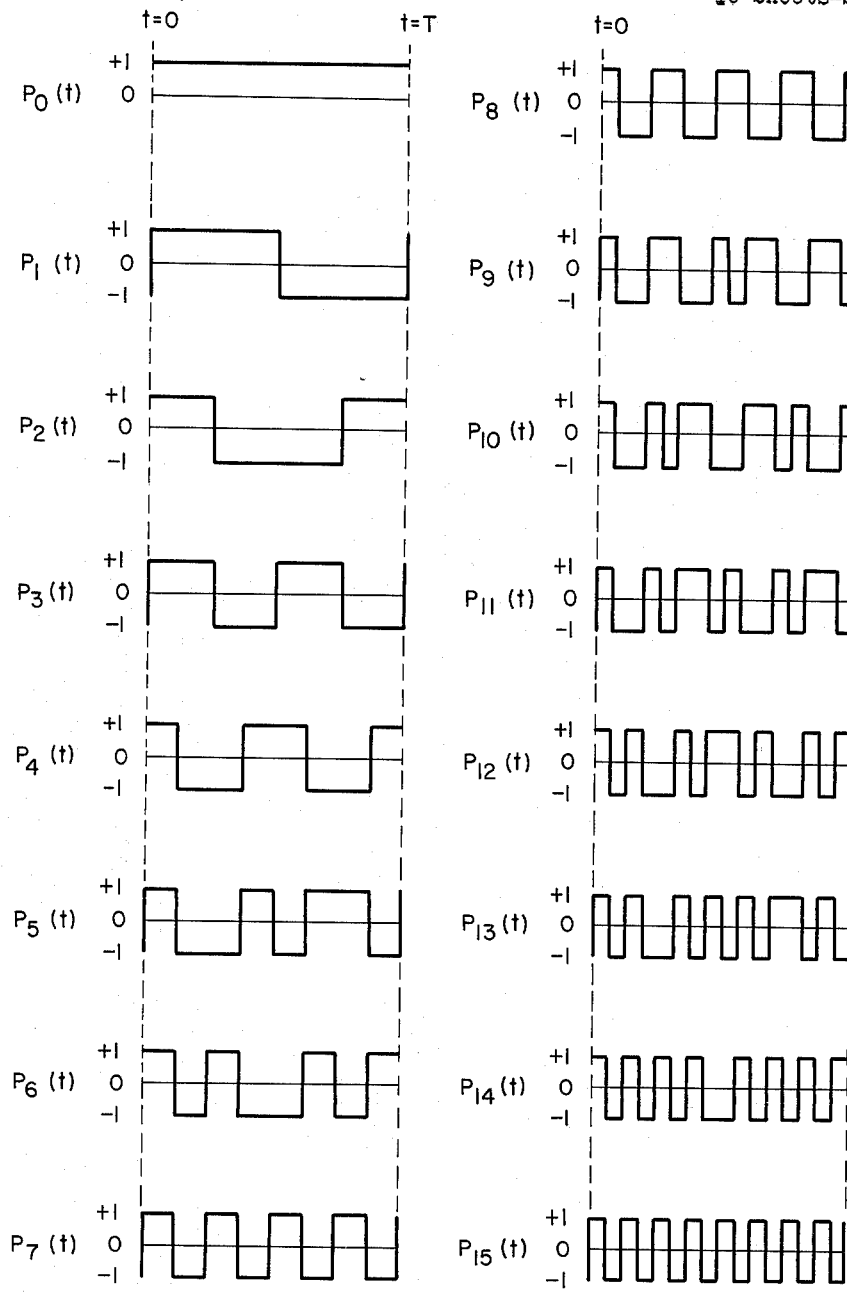
FIGURE 2 illustrates the first sixteen waveforms of the preferred type of orthonormal pulse carrier signals.

FIGURES 3A, 3B, 3C, and 3D illustrate alternate sets of orthonormal pulse waveforms which may be derived from those of FIGURE 2.

Figure 4:
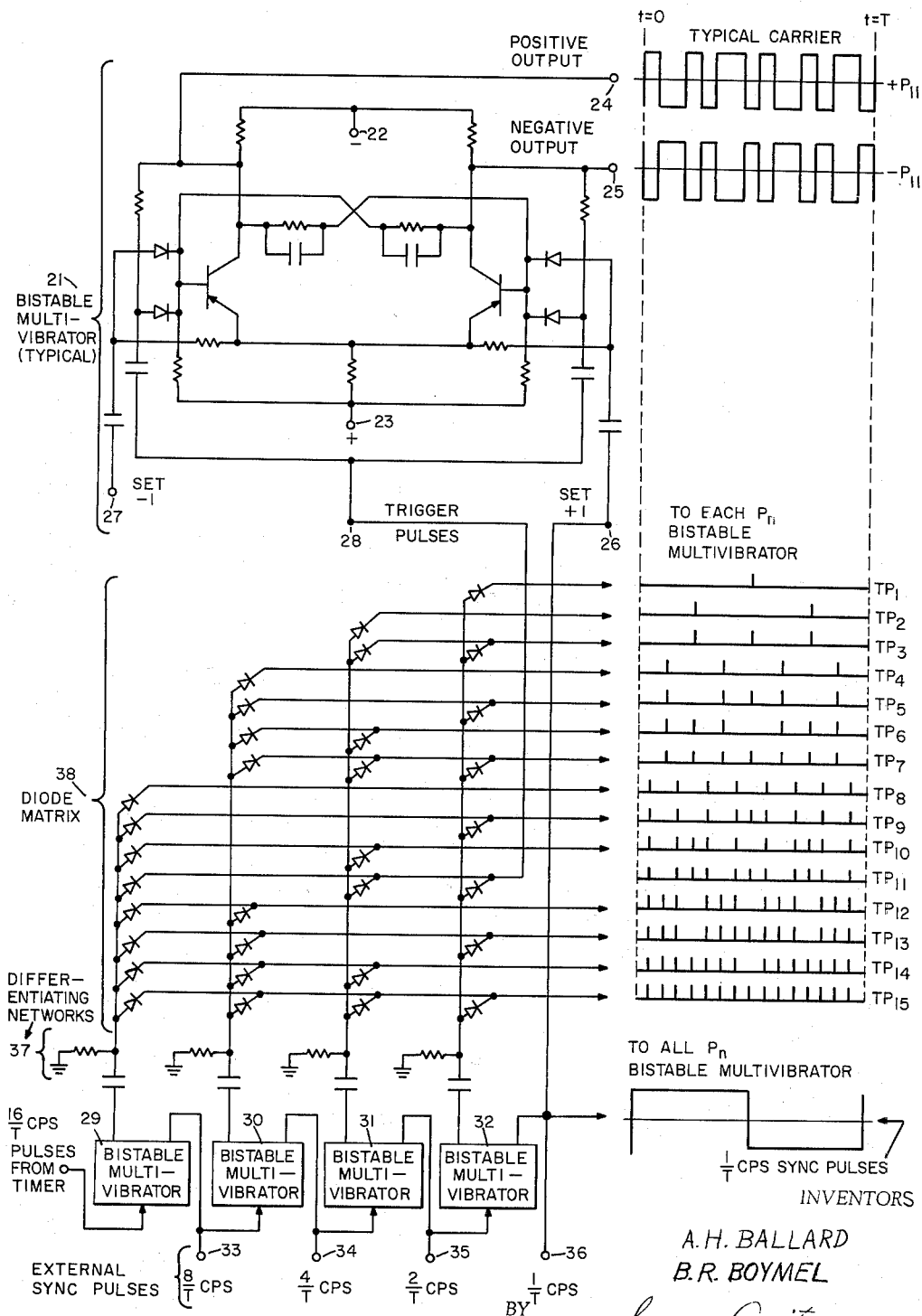

FIGURE 4 shows a preferred method for generating the orthonormal pulse waveforms of FIGURE 2.

Figure 5:
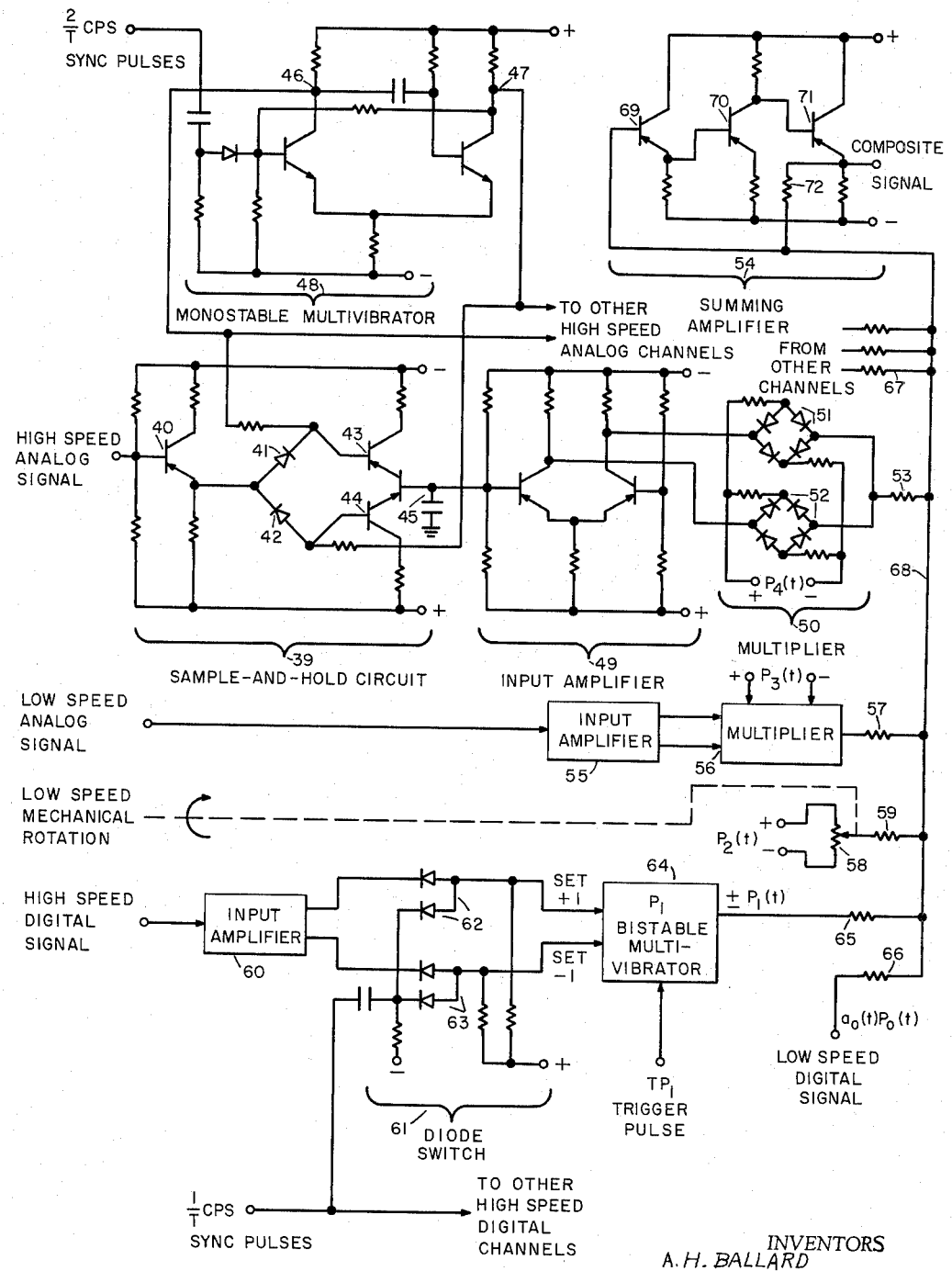

FIGURE 5 shows typical circuits which may be used at the transmitting terminal for processing various input information signals, for modulating appropriate carrier signals, and for producing a composite signal to be transmitted.

Figure 6:
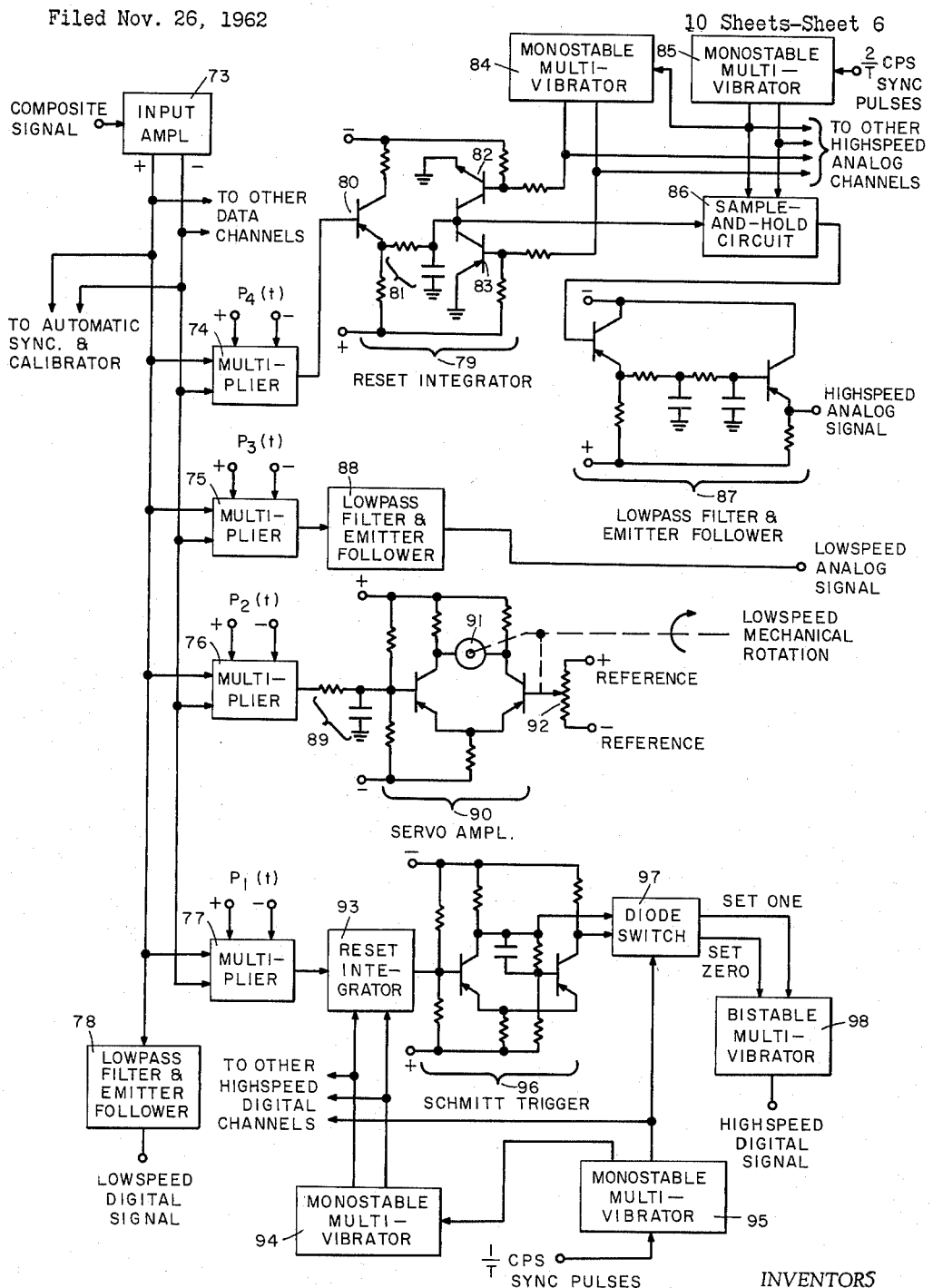

FIGURE 6 illustrates typical circuits which may be used at the receiving terminal for correlating the composite signal with various carrier waveforms, and for recovering the various types of information signals shown in FIGURE 5.

Figure 7:
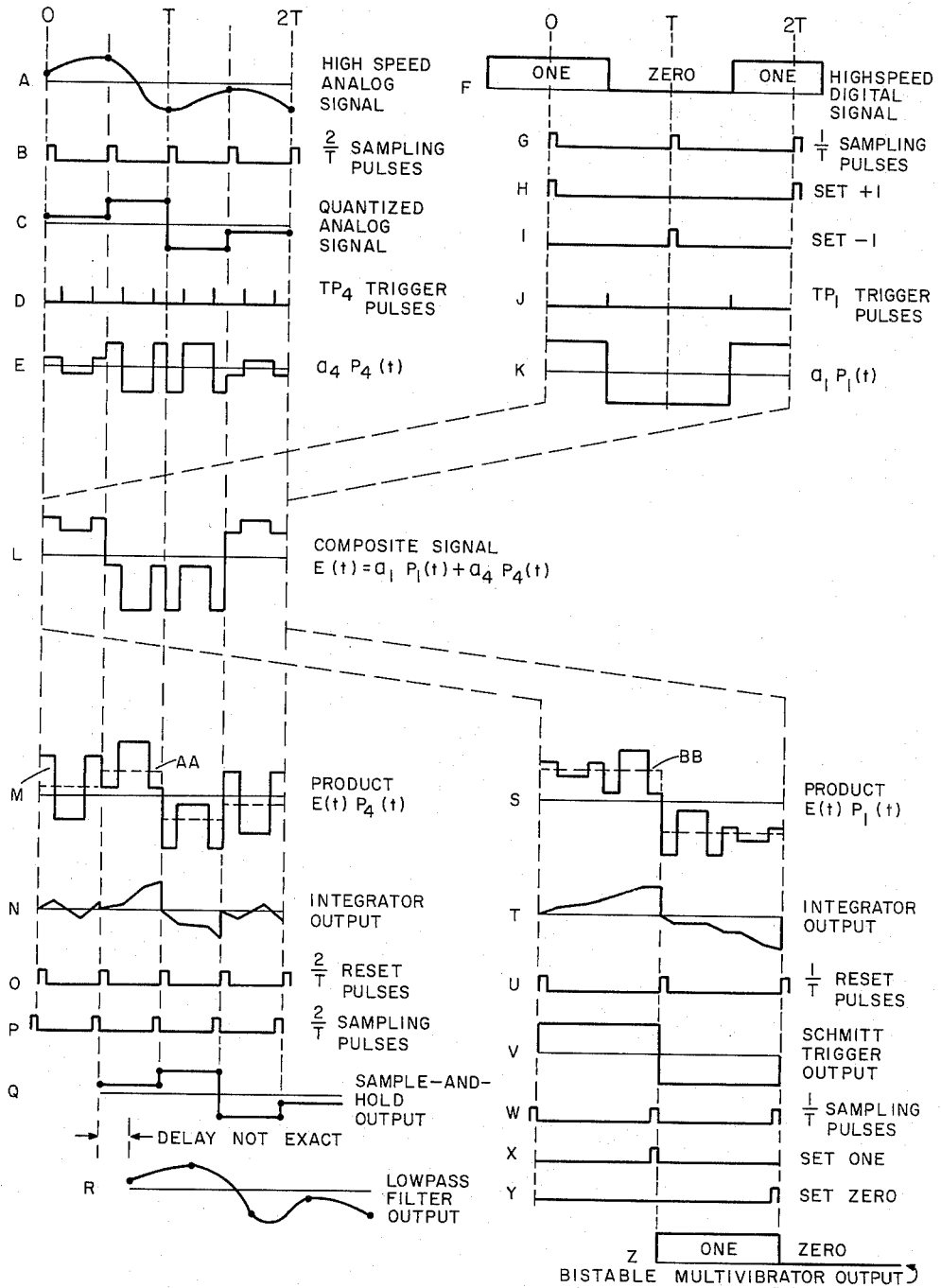

FIGURE 7 shows typical waveforms which are useful for understanding the operation of FIGURES 5 and 6.

Figure 8:
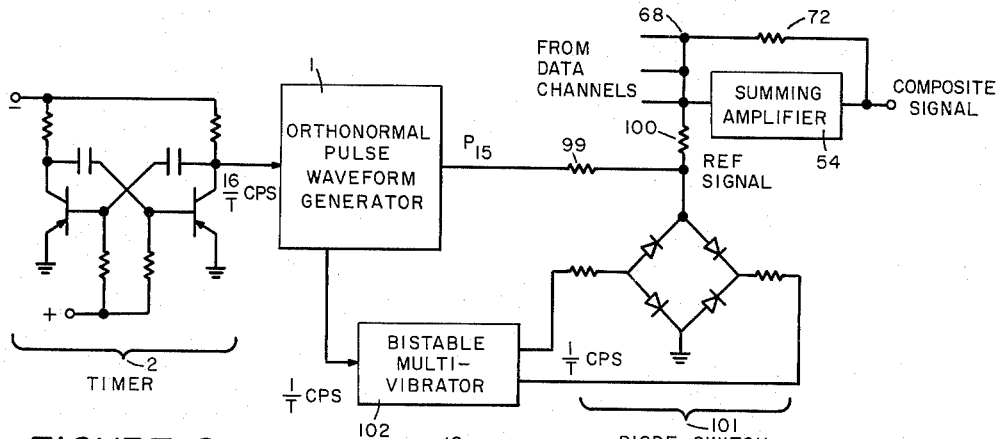

FIGURE 8 is an example of a method for producing a reference signal at the transmitting terminal and for combining it with the composite signal transmitted.

Figure 9:
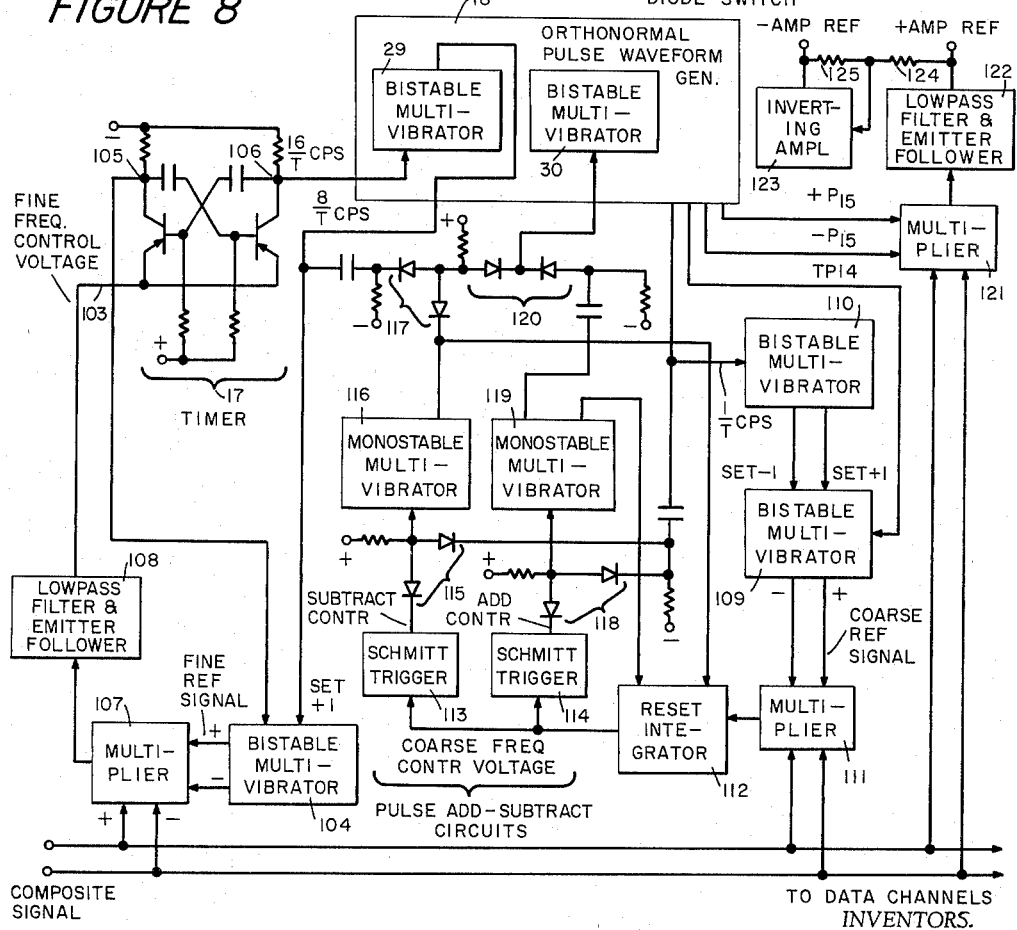

FIGURE 9 is an example of a method for automatically synchronizing the receiving terminal and for extracting an amplitude calibration signal.

Figure 10:
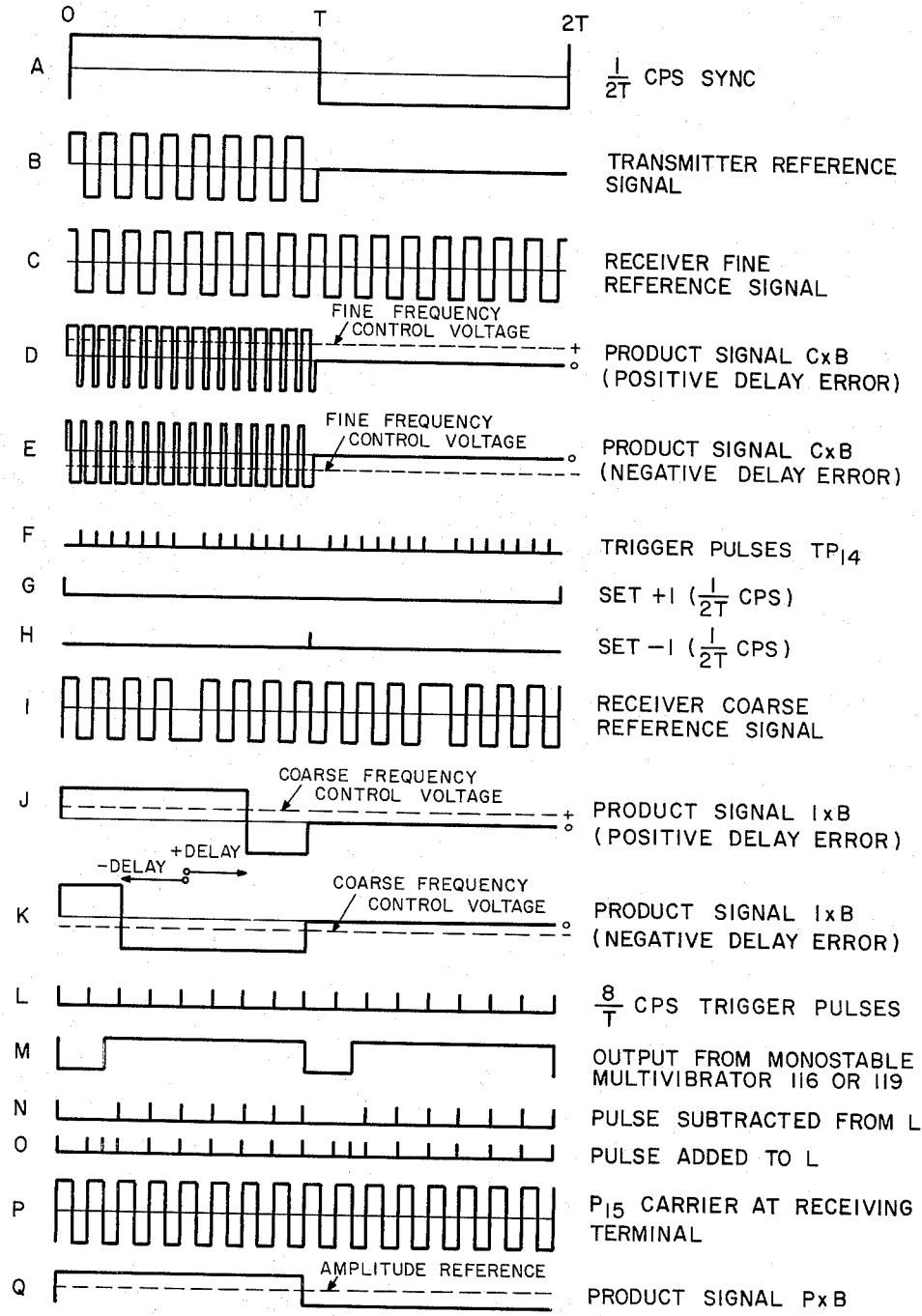

FIGURE 10 gives various time-dependent waveforms useful for understanding the operation of the circuits in FIGURES 8 and 9.

Figure 11:
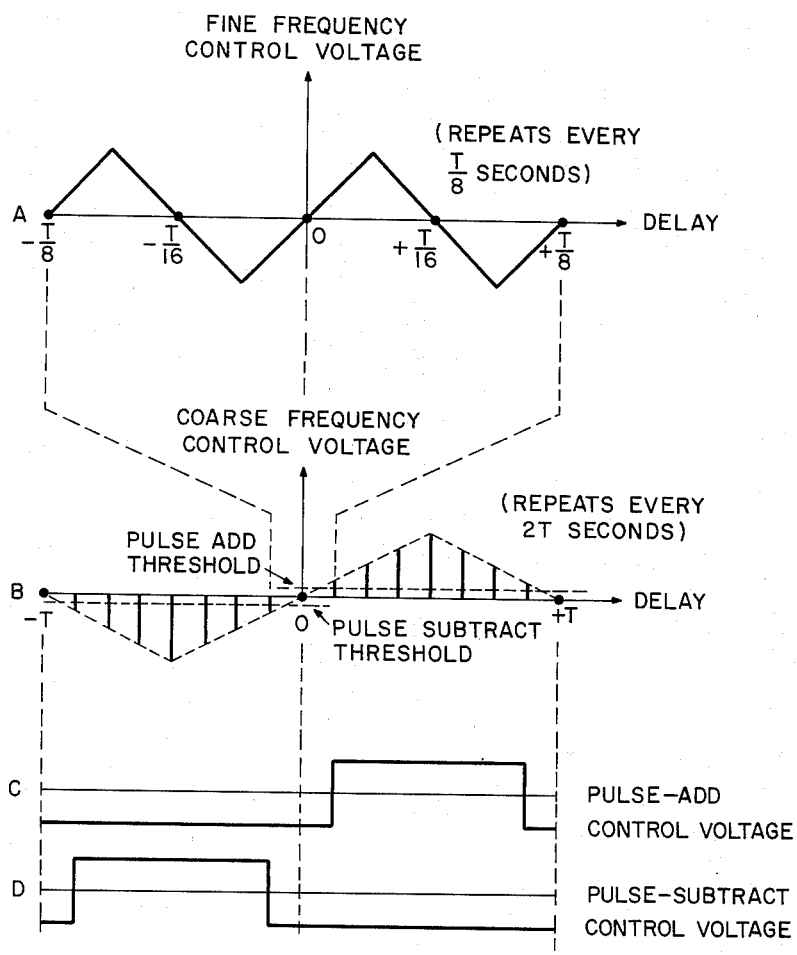

FIGURE 11 shows how certain control voltages in FIGURE 9 vary with the delay between the timing of the receiver and that of the received composite signal.

Figure 1:
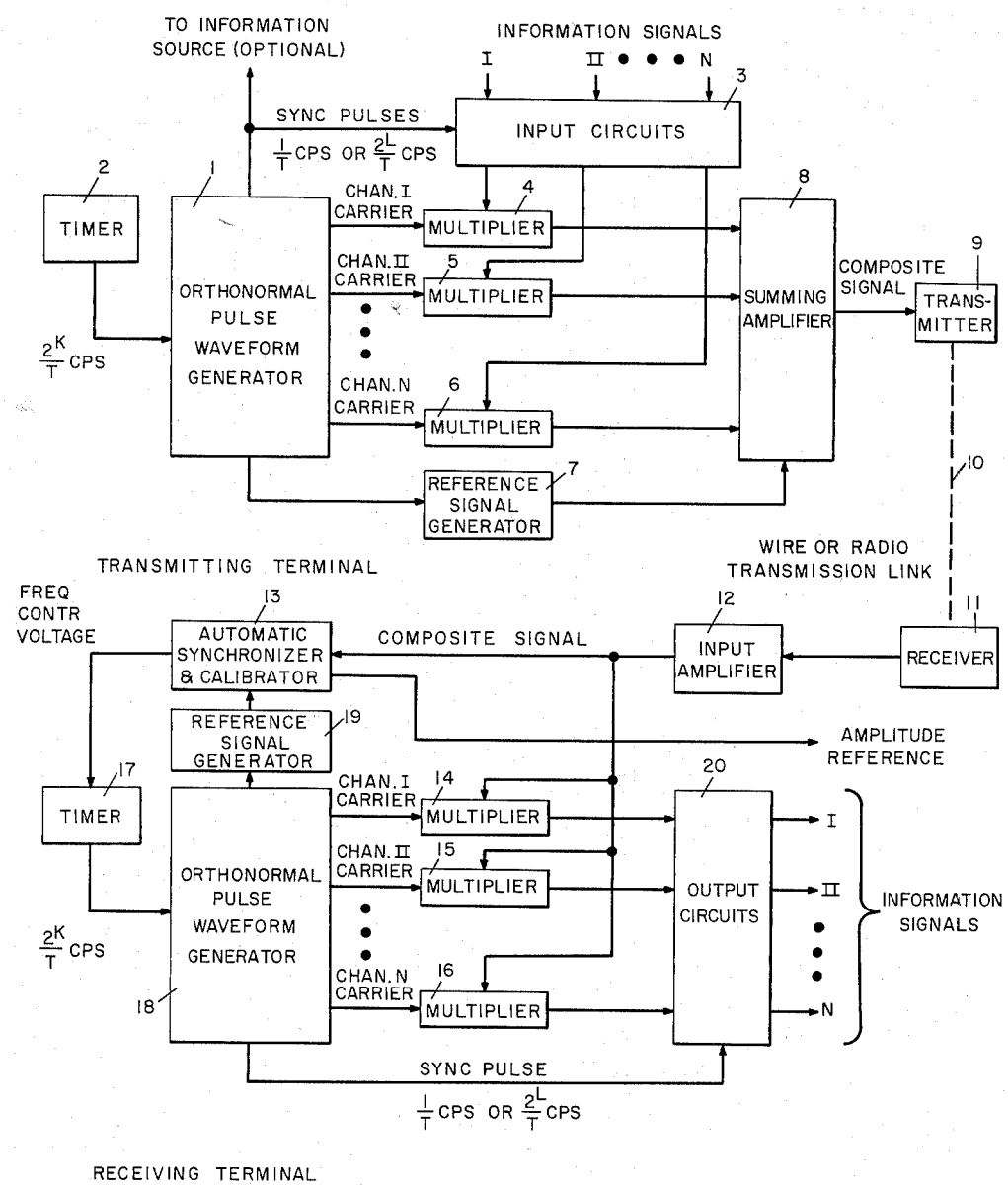
FIGURE 1 is a block diagram illustrating a generalized embodiment of the class of multiplex transmission systems comprising the invention.

Overall operation of the multiplex transmission systems of this invention can be understood by referring to the block diagram in FIGURE 1. The equipment comprising the invention is divided into two parts—one part being located at the transmitting terminal, and the other part being located at the receiving terminal. The two terminals may be remote from each other provided that they are connected by a wire, radio, or other link capable of transmitting electrical signals. Either terminal, or both terminals, may be located in moving vehicles if desired.

Circuit details of the equipment in FIGURE 1 are described later in connection with FIGURES 4 through 11. The equipment is first described in terms of the basic functions it performs.

At the transmitting terminal, orthonormal pulse waveform generator 1 produces the desired set of carrier signals in response to a synchronizing signal from timer 2. All carrier signals have a common repetition period of $T$ seconds, or in other words a common repetition rate of $1/T$ cycles per second. The repetition rate of the synchronizing signal timer 2 is $2^k/T$ cycles per second, or faster than the carrier signal repetition rate by a factor equal to some power of two.

In the input circuits 3, the amplitudes of the various information signals to be transmitted are sampled at the rate of $1/T$ samples per second, assuming for the moment that all information signals are comparable in bandwidth. In accordance with the well-known Nyquist sampling theorem, the rate $1/T$ is chosen to be at least equal to and preferably somewhat greater than twice the bandwidth of the information signals to be transmitted. In typical applications of the invention, the rate $1/T$ might lie in the range from 10 cycles per second to 10 kilocycles per second, although these limits are not restrictive. In the case of digital information signals, it is possible to assure optium sampling by using a signal from the orthonormal pulse wave form generator 1 to synchronize the information source.

Each carrier signal is associated with a different channel of information. The channels are labeled in FIGURE 1 as I, II ... N in order to make it clear that the number of channels N is not restricted to any particular number. The only limitation that exists is that N cannot exceed the factor 2WT, where W is the bandwidth in cycles per second available for transmission of the composite signal. This limitation is imposed by the aforementioned Nyquist sampling theorem which states that a signal limited to a bandwidth W cycles per second can contain at most 2W independent samples per second.

A secondary condition to be met is that the number of channels N cannot exceed the factor $2^K$. This condition can usually be satisfied by proper design of the timer 2 and orthonormal pulse waveform generator 1, which can easily be made to operate at rates up to several megacycles per second, if necessary.

As will be demonstrated later, it is not essential that all information signals be sampled at the same rate. If the various information signals exhibit widely different bandwidths, the slowest speed channels may be sampled at the basic rate of $1/T$ cycles per second, and the higher speed channels may be sampled at one or more rates which are faster by some power of two; that is, $2^L/T$ cycles per second. Thus a channel sampled at $2/T$ cycles per second may be used in lieu of two channels sampled at $1/T$ cycles per second; a channel sampled at $4/T$ samples per second may be used in lieu of four channels sampled at $1/T$ cycles per second; and so on.

The input circuits 3 assure that all information signals remain constant between sampling times. They also assure that the information signals are delivered at proper voltage and impedance levels to the multiplier circuits 4, 5, and 6, and identical multiplier circuits for each additional channel not shown specifically in FIGURE 1. In the multiplier circuits exemplified by 4, 5, and 6, each carrier waveform is modulated in amplitude by its corresponding information signal. The modulation process consists of four-quadrant multiplication (either the carrier signal, the information signal, or both signals may be positive or negative in polarity). This process is equivalent to double sideband, suppressed carrier, amplitude modulation.

In addition, a reference signal having constant modulation is produced by the reference signal generator 7 in response to synchronizing signals from the orthonormal pulse waveform generator 1. The waveform produced by reference signal generator 7 contains zero-crossings which establish a timing reference for the information channels, and the amplitude of the reference signal establishes an amplitude scaling reference for the information channels.

The modulated carrier signals from multipliers 4, 5, 6, and the like multipliers for other channels, as well as the reference signal from reference signal generator 7 are applied to summing amplifier 8, where they are added together in linear algebraic fashion. The composite signal produced by summing amplifier 8 is applied to a transmitter 9 which sends the composite signal over a wire or radio transmission link 10 to a remote receiver 11.

The transmitter 9, transmission 10, and receiver 11 are conventional and are not considered a fundamental part of the present invention. Depending upon the particular transmission link 10 to be used, the transmitter 9 and receiver 11 may contain additional modulation and demodulation equipment for placing the composite signal in an advantageous portion of the radio-frequency spectrum. The principal requirements on the transmitter 9, transmission link 10, and receiver 11, are first that in combination they should exhibit a signal gain of approximately unity, essentially independent of signal level, over a bandwidth somewhat greater than $N/2T$ cycles per second; and second that they should not introduce an unreasonable amount of noise.

At the receiving terminal, the composite signal recovered by receiver 11 is applied to input amplifier 12, which delivers the composite signal at a proper voltage and impedance level to the automatic synchronizer-calibrator 13, and to the set of multipliers exemplified by 14, 15, and 16. The principal purpose of the automatic synchronizer-calibrator 13 is to bring the timer 17 into proper frequency and phase relationship with the received composite signal. This purpose is accomplished by means of the control loop containing timer 17, orthonormal pulse waveform generator 18, and reference signal generator 19. The reference signal produced by reference signal generator 19 is compared to the reference signal component of the received composite signal in the automatic synchronizer-calibrator 13. An error signal is generated in the automatic synchronizer-calibrator 13 which is applied as a frequency control voltage to timer 17. A secondary purpose of the automatic synchronizer-calibrator 13 is to produce an amplitude reference signal, which may be used to calibrate the various received information channels.

The orthonormal pulse waveform generator 18 is used to produce the same set of carrier waveforms as those produced at the transmitting terminal. The carrier waveforms are applied to the set of multipliers exemplified by 14, 15 and 16 where each carrier waveform is multiplied by the received composite signal. The product signals from the multipliers exemplified by 14, 15 and 16 are applied to the output circuits 20 where each product signal undergoes either a synchronously-reset integration or an equivalent lowpass filtering process. Synchronous integration in the output circuits 20, when used, is started and stopped by synchronizing pulses at a rate of $1/T$ cycles per second, or alternatively at a rate of $2^k/T$ cycles per second, which are made available from the orthonormal pulse waveform generator 18. The output circuits 20 also provide for regeneration of the various information signals if necessary and deliver the information signals to external equipment at suitable voltage and impedance levels.

In FIGURE 2 are shown sixteen examples of rectangular, overlapping, orthonormal pulse waveforms whose use as carrier signals is a basic feature of the present invention. The sixteen waveforms are arranged in an orderly sequence from $P_0(t)$ through $P_{15}(t)$. Each waveform always has a value of $+1$ or $-1$, the distinguishing feature of each waveform being the number and position of its zero crossings during the common repetition period T.

The $P_0(t)$ waveform is constant at $+1$ for the entire interval and contains no zero crossings. The $P_1(t)$ waveform has one internal zero crossing at $$t=\frac{T}{2}$$

while the $P_2(t)$ waveform has two internal zero crossings at $$t=\frac{T}{4} \text{ and } t=\frac{3T}{4}$$

Each higher order waveform also has a number of internal zero crossings equal to its index number, additional zero crossings being added in a systematic binary relation. The $P_3(t)$ waveform is obtained for example by combining the zero crossings of $P_1(t)$ and $P_2(t)$. The $P_4(t)$ waveform has zero crossings only at odd multiples of $T/8$. The $P_5(t)$ waveform combines the zero crossings of $P_4(t)$ and $P_1(t)$; the $P_6(t)$ waveform combines the zero crossings of $P_4(t)$ and $P_2(t)$; and so on up to $P_7(t)$. The $P_8(t)$ waveform has zero crossings at odd multiples of $T/16$; the $P_9(t)$ waveform combines the zero crossings of $P_8(t)$ and $P_1(t)$; and so on up to $P_{15}(t)$. This progression can be extended as far as desired, keeping in mind that whenever the index number $n$ is a power of two, the zero crossings occur at odd multiples of $T/2n$.

That the set of waveforms in FIGURE 2 is orthonormal can be verified by inspection. The average product of any pair is zero because they are equal in sign for one half of the interval and opposite in sign for the remaining half of the interval. Each waveform individually has a mean square value of unity because its amplitude is always either $+1$ or $-1$.

If the $+1$ level is associated with a binary ONE, and the $-1$ level is associated with a binary ZERO, the pulse waveforms of FIGURE 2 are equivalent to the Reed-Muller error correcting codes, as described in the article A Class of Multiple Error Correcting Codes and the Decoding Scheme, by I. S. Reed, IRE-PGIT Transactions, September 1954. The same waveforms together with their negative waveforms, have also been used for improved detection of single channel digital data, as described in the article On Coded Phase-Coherent Communications, by A. J. Viterbi, IRE-PGSET Transactions, March 1961. Previous applications of the waveforms in FIGURE 2 have been for a fundamentally different purpose than the present invention, wherein they are used as carrier signals for multiplex transmission systems.

The scope of the present invention includes not only the set of carrier waveforms shown in FIGURE 2, but also any subset of these waveforms, or any extended set including higher order waveforms, or any set of waveforms, which are derivable from the waveforms of FIGURE 2 and their higher order extensions by simple transformations which leave their orthonormal property unchanged. Such transformations may consist, for example, of reversing the polarity of selected waveforms, rearranging the index sequence of selected waveforms, rearranging corresponding time segments of all waveforms, or reversing the polarity of all waveforms during selected segments of time.

Figure 3A:
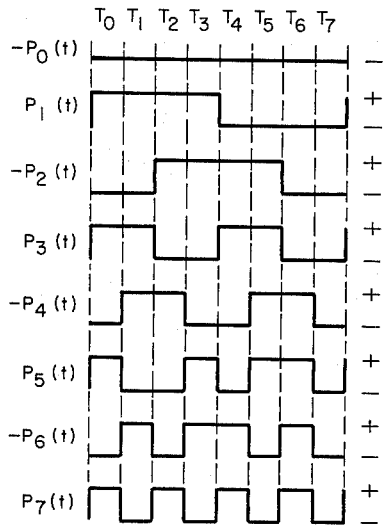
Figure 3B:
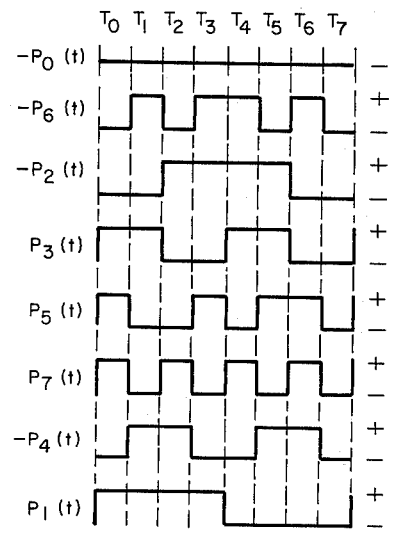
Figure 3C:
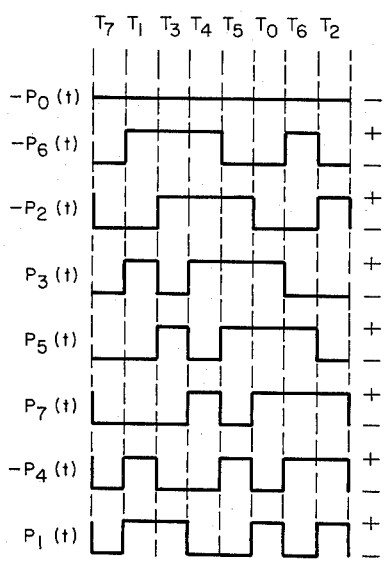
Figure 3D:
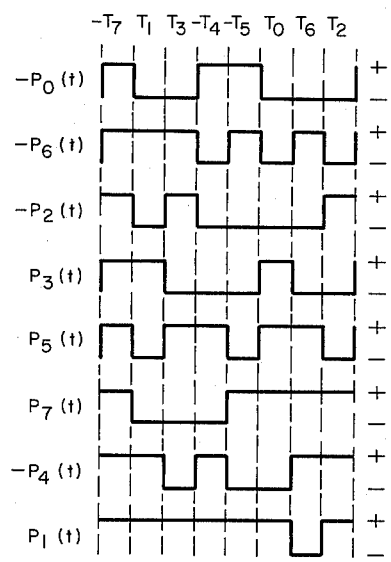

FIGURES 3A, 3B, 3C, and 3D illustrate some of the alternate sets of orthonormal pulse waveforms which may be derived from those of FIGURE 2. In FIGURE 3A, the first eight waveforms of FIGURE 2 have been modified by reversing the polarities of waveforms $P_0(t)$, $P_2(t)$, $P_4(t)$, and $P_6(t)$. In FIGURE 3B, the waveforms of FIGURE 3A have been further modified by rearrangement so that the new sequence of waveform index numbers is 0, 6, 2, 3, 5, 7, 4, 1. In FIGURE 3C, the waveforms of FIGURE 3B have been further modified by re-rearrangement of the time segments comprising one eighth of the repetition period, into a new sequence $T_7$, $T_1$, $T_3$, $T_4$, $T_5$, $T_0$, $T_6$, $T_2$. In FIGURE 3D, the waveforms of FIGURE 3C have been further modified by reversing polarity of all waveforms during the original time segments $T_4$, $T_5$, and $T_7$. All of these modifications or transformations preserve the orthonormal property of the original waveform set, and thus produce alternate waveform sets which fall within the scope of the present invention. The set of waveforms in FIGURE 2 is preferred, however, because of its systematic arrangement and the ease with which the waveforms may be generated simultaneously.

In selecting the carrier waveforms to be used for a specific transmission link, it is often desirable to select a subset of the waveforms shown in FIGURE 2 whose frequency spectrum characteristics are compatible with the bandpass characteristics of the transmission link. Well-known methods of Fourier spectrum analysis may be applied to show that each odd numbered waveform has the same frequency spectrum except for phase as the next higher even numbered waveform, and that each even numbered waveform $P_n(t)$ exhibits a spectrum peak at a frequency of $n/2T$ cycles per second. The $P_0(t)$ waveform, for example, would ordinarily not be used on a link not having response at very low frequencies. As another example, if the link has a conventional audio bandpass from 300 cycles per second to 3000 cycles per second and the sampling rate $1/T$ is equal to 500 cycles per second, the selected set of waveforms might consist of $P_1(t)$ through $P_{10}(t)$ which have frequency spectrum peaks in the range from $1/T$ to $5/T$, or in this case from 500 cycles per second to 2500 cycles per second.

Another reason for selecting a subset of the waveforms in FIGURE 2 is the possible requirement for different sampling rates per channel. For example, $P_0(t)$ through $P_3(t)$ might be used to sample four low speed channels at the basic rate $1/T$ cycles per second. Waveform $P_4(t)$ might then be used for a higher speed channel sampled at $2/T$ cycles per second because the $P_4(t)$ waveform is still orthonormal to the lower order waveforms during each half interval $T/2$. To verify this statement, observe that during the first half interval, the $P_4(t)$ waveform appears as a time-compressed $P_2(t)$ waveform; while $P_3(t)$ and $P_2(t)$ appear as time-compressed $P_1(t)$ waveforms; and $P_1(t)$ and $P_0(t)$ appear as time-compressed $P_0(t)$ waveforms. A similar relation holds true for the second half interval. Waveforms $P_5(t)$ cannot be used in this case because it is not orthonormal to $P_4(t)$ during each half interval. Waveform $P_6(t)$ and every second higher waveform can be used to sample additional channels at the $2/T$ cycles per second rate, however, because they remain orthogonal to $P_4(t)$ and the other selected waveforms during each half interval. In general, if the higher sampling rate is $2^L/T$ cycles per second, only every $2^L$th waveform can be selected in order that the orthonormal property is preserved during each sub-interval of $T/2^L$.

FIGURE 4 shows a preferred circuit arrangement for the orthonormal pulse waveform generator used to produce the waveforms of FIGURE 2. Each waveform is produced with both normal and inverted polarity by means of a bistable multivibrator. Waveform $P_0(t)$ is an exception. It does not actually have to be generated as explained later in connection with FIGURE 5. Bistable multivibrator 21 is typical of the circuits used for generating each carrier waveform other than $P_0(t)$. The circuit is conventional except that the power supply voltages connected to terminals 22 and 23 are chosen so that the positive carrier signal at output terminal 24 and the negative carrier signal at output terminal 25 are symmetrical about the zero voltage level. The carrier signal amplitudes alternate between the normalized levels of $+1$ and $-1$, where in typical applications, unit amplitude might correspond to a voltage somewhere between 1 volt and 10 volts, although these limits are not restrictive.

A positive pulse applied to terminal 26 causes the output signal at terminal 24 to go to its $+1$ level, while a positive pulse applied to terminal 27 causes the output signal at terminal 24 to go to its $-1$ level. Positive pulses applied to terminal 28 trigger the bistable multivibrator 21 so that it changes state and reverses the polarity of the signals at its output terminals 24 and 25.

The positive pulses applied to bistable multivibrator 21 and identical bistable multivibrators for additional carrier waveforms are produced in the following way. For purposes of illustration, it will be assumed that no more than 16 waveforms—$P_0(t)$ through $P_{15}(t)$—are to be generated so that timer 2 and timer 17 of FIGURE 1 operate at a frequency of $16/T$ cycles per second. The pulses from timer 2 or 17 are applied to the chain of four bistable multivibrators 29, 30, 31, and 32 which operate as a conventional binary counter. The positive output terminal of each bistable multivibrator is connected to the trigger input of the succeeding bistable multivibrator. As each bistable multivibrator goes from the $-1$ state to its $+1$ state, the positive-going signal at its positive output terminal triggers the next bistable multivibrator to its opposite state. These triggering signals which occur at $8/T$ cps., $4/T$ cps., $2/T$ cps., and $1/T$ cps., are also made available at terminals 33, 34, 35, and 36 respectively for synchronizing other parts of the system.

As each multivibrator 29, 30, 31, or 32 goes from its $+1$ state to its $-1$ state, the differentiating networks 37 connected to their negative output terminals produce a set of non-overlapping positive pulses. After being clipped in diode matrix 38, these non-overlapping pulse signals appear as waveforms TP8, TP4, TP2, and TP1. Waveform TP8, which is derived from bistable multivibrator 29, contains eight trigger pulses occurring at odd multiples of $T/16$. Similarly TP4 from bistable multivibrator 30 contains four trigger pulses at odd multiples of $T/8$, TP2 from bistable multivibrator 31 contains two trigger pulses at odd multiples of $T/4$; and TP1 from bistable multivibrator 32 contains one trigger pulse at $T/2$. In diode matrix 38, trigger pulses TP8, TP4, TP2, and TP1 are combined in binary fashion to generate the remaining trigger pulse waveforms TP9 through TP15, TP5 through TP7, and TP3. Each trigger pulse waveform contains positive pulses at the desired internal zero crossing points of the carrier waveform having the same index number.

Bistable multivibrator 21 is shown as producing the carrier waveforms $+P_{11}(t)$ and $-P_{11}(t)$ for illustration. At the beginning of each period T, the $1/T$ cps. synchronizing pulses connected to terminal 26 set bistable multivibrator 21 to its $+1$ state. Thereafter, the trigger pulses TP11 connected to terminal 28 reverse the state of bistable multivibrator 21 to produce the desired carrier output signals $\pm P_{11}(t)$ at terminals 24 and 25. Each bistable multivibrator used to generate the other carriers operates in the same way, the only difference being the triggering pulses applied to it. In the cases of the carrier waveforms $P_{15}(t)$, $P_7(t)$, $P_3(t)$ and $P_1(t)$ it is actually unnecessary to provide additional bistable multivibrators for their generation since they are already available at the output terminals of bistable multivibrators 29, 30, 31, and 32 respectively.

Numerous variations on the circuits shown in FIGURE 4 may also be used to obtain equivalent performance.

FIGURE 5 shows several typical circuit arrangements for modulating the orthonormal pulse carriers with various types of information signals and for producing a composite signal at the transmitting terminal. To illustrate the variety of modulation techniques which are possible, the following situation is assumed. A high speed analog signal of nominal bandwidth $1/T$ cycles per second is sampled at a rate of $2/T$ samples per second and transmitted on the $P_4(t)$ carrier channel; a lowspeed analog signal of bandwidth much less than $1/T$ cycles per second is sampled at $1/T$ samples per second and transmitted on the $P_3(t)$ carrier channel; a lowspeed mechanical shaft rotation of bandwidth much less than $1/T$ cycles per second is sampled at $1/T$ per second and transmitted on the $P_2(t)$ carrier channel; a high speed digital signal at a rate of $1/T$ digits per second is sampled synchronously at $1/T$ samples per second and transmitted on the $P_1(t)$ carrier channel; and finally a lowspeed digital signal at a rate much slower than $1/T$ digits per second is transmitted without sampling on the $P_0(t)$ carrier channel. The waveforms of FIGURE 7 illustrate how the various information signals are processed by the transmitting circuits of FIGURE 5.

The high speed analog signal might typically appear as shown by waveform A of FIGURE 7. It is applied to the sample-and-hold circuit 39 of FIGURE 5, in which transistor 40 functions as an emitter follower, diodes 41 and 42 and transistors 43 and 44 function as a bi-directional sampling switch, and capacitor 45 functions as a memory or holding device. Normally diodes 41 and 42 and transistors 43 and 44 are held in a virtually non-conducting state by the positive voltage at terminal 46 and the negative voltage at terminal 47 of monostable multivibrator 48.

Synchronizing pulses, at a rate of $2/T$ pulses per second in this case, are applied to monostable multivibrator 48 to turn it on at the desired sampling times. The proper synchronizing pulses are available at terminal 35 of FIGURE 4. Each time that monostable multivibrator 48 turns on, short positive pulses as shown by waveform B of FIGURE 7 appear at terminal 47, and corresponding negative pulses appear at terminal 46. The duration of these pulses is short compared to the interval T, but long enough to permit charging of memory capacitor 45 and similar capacitors on all sample-and-hold circuits to which monostable multivibrator 48 is connected.

The reversal of bias voltage on diodes 41, 42 and transistors 43, 44 causes them to conduct strongly and to present a low impedance path between emitter follower 40 and memory capacitor 45. At each sampling time the voltage on memory capacitor 45 charges up or down to the output voltage of emitter follower 40, and each voltage sample is held constant in memory capacitor 45 until the next sampling instant. If waveform A is the high speed analog signal being sampled, waveform C shows how it will appear in quantized form on memory capacitor 45.

The voltage on memory capacitor 45 is applied to the input amplifier 49 whose purpose is to provide proportional output signals at low impedance which are equal but opposite in polarity. The two output signals from input amplifier 49 are applied to multiplier 50 whose function is to multiply the quantized voltage of waveform C by the $P_4(t)$ carrier waveform.

Multiplier 50 consists of two diode switches 51 and 52, which are alternately made conducting or non-conducting by the polarity reversals of the $P_4(t)$ carrier waveform. When the $P_4(t)$ waveform has the polarity indicated in FIGURE 5, diode switch 51 conducts, connecting the sampled information voltage to resistor 53 with normal polarity. When the $P_4(t)$ waveform reverses polarity, diode switch 52 conducts, connecting sampled information voltage to resistor 53 with inverted polarity.

Resistor 53 is a part of the summing network associated with summing amplifier 54. The modulated carrier voltage applied to resistor 53 appears as waveform E of FIGURE 7. During each interval $1/2T$, waveform E consists of the $P_4(t)$ carrier waveform scaled in amplitude by the corresponding quantized voltage in waveform C.

The input amplifier 55, multiplier 56, and summing resistor 57 shown for the $P_3(t)$ channel illustrate the simplifications possible when the input information signal is of much lower bandwidth than the carrier repetition rate. A sample-and-hold circuit is not required because the information signal will already be essentially constant during each carrier repetition period by virtue of its low bandwidth, which implies a slow rate of change. Input amplifier 55, multiplier 56, and summing resistor 57 are identical in design with input amplifier 49, multiplier 50, and summing resistor 53 respectively.

A further simplification is possible when the input information signals consists of a slow speed mechanical shaft rotation, as shown for the $P_2(t)$ channel. Multiplication is accomplished by means of the potentiometer 58. The carrier waveform, $P_2(t)$ in this case, is applied with opposite polarity to the two ends of potentiometer 58, and the rotational input signal varies the position of the variable tap. The voltage at the tap of potentiometer 58 is applied to summing resistor 59 which is identical with summing resistors 53 and 57.

In the case of high speed digital signals, a slightly different modulation method may be used as shown in the $P_1(t)$ channel of FIGURE 5. The digital information signal is either generated synchronously or converted to synchronous form at a rate of $1/T$ digits per second in response to synchronizing signals from the orthonormal pulse waveform generator of FIGURE 4. A typical digital input signal is shown as waveform F in FIGURE 7. It is applied to input amplifier 60, which may be identical with input amplifier 49 and serves to make the information signal available at low impedance with equal and opposite polarity.

The digital information signal is sampled at a rate of $1/T$ samples per second in diode switch 61, which contains two coincidence gates 62 and 63. The sampling times are shown in waveform G of FIGURE 7. When the digital information signal is a binary ONE, coincidence gate 62 conducts, causing the sampling pulse to set bistable multivibrator 64 to its $+1$ starting condition. When the digital information signal is a binary ZERO, coincidence gate 63 conducts, causing the sampling pulse to set bistable multivibrator 64 to its $-1$ starting condition. The SET $+1$ and SET $-1$ pulses are shown as waveforms H and I respectively in FIGURE 7, corresponding to the digital information signal of waveform F.

Bistable multivibrator 64 performs an identical function for the $P_1(t)$ channel as the bistable multivibrator 21 described as a part of the orthonormal pulse waveform generator in FIGURE 4. In this case, however, it is set initially to either its $+1$ state or its $-1$ state depending upon whether the digital information signal is a ONE or ZERO respectively. During each period T, it is reversed in state by the TP1 trigger pulses shown as waveform J of FIGURE 7. Thus bistable multivibrator 64 produces $+P_1(t)$ when the digital information signal is a ONE, and $-P_1(t)$ when the digital information signal is a ZERO. Waveform K of FIGURE 7 shows the modulated output signal of bistable multivibrator 64, which is connected to the summing resistor 65.

In the case of the $P_0(t)$ channel, the use of a modulator circuit and in fact the generation of the $P_0(t)$ carrier, is unnecessary. Since the $P_0(t)$ waveform always has a value of unity, multiplication of an information signal by the $P_0(t)$ carrier would leave it unchanged. As shown in FIGURE 5, the information signal for the $P_0(t)$ may be tied directly to summing resistor 66 if the information signal is low in speed relative to the rate $1/T$ cycles per second. A synchronized high-speed digital signal could also be tied directly to summing resistor 66, but a high speed analog signal on the $P_0(t)$ channel would still require a sample-and-hold circuit similar to 39.

Addition of the modulated signals is accomplished by the summing resistors 53, 57, 59, 65, 66, and similar resistors 67 for the other channels, which are tied to the common summing junction 68. Summing junction 68 is also connected to the summing amplifier 54 which compensates for attenuation in the addition process and produces a composite signal at low impedance. Summing amplifier 54 contains an emitter follower 69 for high input impedance, an amplifier 70 for high gain, and an emitter follower 71 for low output impedance. Resistor 72 provides negative feedback for good linearity and for stabilizing the gain of summing amplifier 54.

A typical composite signal produced by summing amplifier 54 is shown as waveform L in FIGURE 7. For clarity, only the $P_4(t)$ channel which contains a high speed analog signal sampled $2/T$ times per second, and the $P_1(t)$ channel which contains a high speed digital signal sampled $1/T$ times per second, are shown. The other information signals have been set to zero amplitude to simplify the illustration, but in general each channel will contribute a component of the form $a_n P_n(t)$ during each sampling period.

FIGURE 6 shows typical circuits which may be used at the receiving terminal of the system to recover the various types of information signals shown in FIGURE 5. The circuits of FIGURE 6 are further illustrated by the waveforms shown in FIGURE 7. The composite signal such as waveform L in FIGURE 7 is applied to input amplifier 73 in FIGURE 6, which may be similar in design to input amplifier 49 in FIGURE 5. Input amplifier 73 produces two output composite signals, equal but opposite polarity, at proper voltage and impedance levels for application to the multipliers 74, 75, 76, and 77 in the $P_4(t)$, $P_3(t)$, $P_2(t)$, and $P_1(t)$ channels respectively. The positive polarity composite signal is also applied to lowpass filter and emitter follower 78 in the $P_0(t)$ channel. The composite signal of both polarities is also applied to the automatic synchronizer and calibrator, to be described later in connection with FIGURE 9.

Like the received composite signals, the $P_4(t)$ carrier waveform is applied with both polarities to multipliers 74, which may be identical to multiplier 50 in FIGURE 5. The product signal at the output of multiplier 74 appears as waveform M in FIGURE 7. During each sampling period of $T/2$ seconds, the product signal M oscillates about the average levels shown by waveform AA.

The average value of waveform M during each $T/2$ period is detected by reset integrator 79. It consists of the emitter follower 80, integrating network 81, and the resetting transistor switches 82 and 83. The product signal from multipliers 74 is applied by emitter follower 80 to the integrating network 81. The voltage output of integrating network 81 builds up either positively or negatively as shown by waveform N of FIGURE 7. At the end of each $T/2$ period the integrating network 81 is reset to zero voltage by one of the transistor switches 82 or 83. Transistor switch 82 discharges a stored positive voltage to ground potential, while transistor switch 83 discharges a stored negative voltage to ground potential.

Transistor switches 82 and 83 are turned on by short pulses derived from monostable multivibrator 84. Monostable multibrator 84 is triggered by monostable multivibrator 85 which is triggered at $2/T$ cycles per second by synchronizing pulses from the orthonormal pulse waveform generator of FIGURE 4. Positive pulses from monostable multivibrator 84 are used to actuate transistor switch 82 as shown in waveform O of FIGURE 7. Similar pulses of negative polarity turn on transistor switch 83.

The integrated voltage from reset integrator 79 is applied to the sample-and-hold circuit 86, which may be identical in design to sample-and-hold circuit 39 of FIGURE 5. Just prior to the resetting of reset integrator 79, the sample-and-hold circuit is actuated by monostable multivibrator 85, as shown by waveform P in FIGURE 7. In sample-and-hold circuit 86, the final integrated value of waveform N is sampled for each $T/2$ period and held constant for the next succeeding $T/2$ period. Waveform Q illustrates the output signal from sample-and-hold circuit 86, which may be recognized as a delayed replica of the quantized analog signal in waveform C.

The voltage transitions in waveform Q due to sampling are smoothed out in the lowpass filter and emitter follower 87. By filtering out waveform components higher than $1/T$ cycles per second in frequency, the lowpass filter and emitter follower produces waveform R, which is a delayed replica of the original high speed analog signal in waveform A.

Other high speed analog channels operate in the same way as described above. Monostable multibrators 84 and 85 may be used as common equipment for all high speed channels operating at $2/T$ samples per second.

The $P_3(t)$ channel also operates in a similar way except that a reset integrator and sample-and-hold circuit are not required in this case because of the low speed information signal used for this channel in FIGURE 5. Only the multiplier 75 and lowpass filter and emitter follower 88 are required in this case. Referring to waveform M of FIGURE 7, if the average value AA of waveform M changes only very slowly from one carrier repetition period to the next, the average value can be extracted by simple lowpass filtering. This is the operation performed by lowpass and emitter follower 88 in the $P_3(t)$ channel. The average value so extracted will be the original lowspeed analog signal applied to the $P_2(t)$ channel in FIGURE 5.

The multiplier 76 and lowpass filter 89 in the $P_2(t)$ channel operate in the same way as multiplier 75 and lowpass filter and emitter follower 88 in the $P_3(t)$ channel. In this case, the servo amplifier 90 and motor 91 are used to convert the recovered lowspeed analog signal back to shaft rotation form. Servo amplifier 90 acts as a differential amplifier, comparing the voltage from lowpass filter 89 to the voltage from reference potentiometer 92. Reference potentiometer 92 is energized by positive and negative reference voltages which are derived as explained in connection with FIGURE 9. A difference in the voltage from lowpass filter 89 and the voltage from reference potentiometer 92 causes servo amplifier 90 to drive motor 91, which in turn moves the tap on reference potentiometer 92 until the voltage difference is reduced to zero. At the equilibrium point of zero voltage difference, the shaft position produced by motor 91 will correspond to the shaft position used to modulate the $P_2(t)$ channel in FIGURE 5.

The circuits used to recover the high speed digital signal on the $P_1(t)$ channel are slightly different. Multiplier 77 is used to multiply the composite signal, waveform L in FIGURE 7, by the $P_1(t)$ carrier waveform to produce the product signal shown as waveform S. The average value of waveform S during each period of T seconds, shown as BB in FIGURE 7, may be recognized as the modulating digital signal of waveform F. Reset integrator 93 detects the average value of waveform S during each period T, as shown by waveform T in FIGURE 7.

The reset pulses of waveform U are applied with both positive and negative polarity to reset integrator 93 by monostable multivibrator 94. Monostable multivibrator 94 is triggered by monostable multivibrator 95, which in turn is triggered at a $1/T$ cps. rate by synchronizing pulses from the orthonormal pulse waveform generator of FIGURE 4. Monostable multivibrators 94 and 95 may be used for all high speed channels operating at $1/T$ samples per second.

The integrated voltage from reset integrator 93 is applied to the Schmitt trigger 96, which is a regenerative amplifier designed to change state when its input voltage passes through zero potential. The output signal from Schmitt trigger 96 is shown as waveform V in FIGURE 7.

Just prior to the end of each integrating period, the state of Schmitt trigger 96 is sampled by the pulses of waveform W, which are applied by monostable multivibrator 95 to diode switch 97. Diode switch 97 operates in similar fashion to diode switch 61 of FIGURE 5. If the Schmitt trigger voltage of waveform V is positive, at the sampling time, diode switch 97 produces a SET ONE pulse as shown by waveform X. If the Schmitt trigger voltage is negative at the sampling time, diode switch 97 produces a SET ZERO pulse as shown by waveform Y.

The SET ONE pulses and SET ZERO pulses are applied to bistable multivibrator 98 to reproduce the high speed digital information signal. The output signal from bistable multivibrator 98 is shown as waveform Z in FIGURE 7, and may be recognized as a delayed replica of the input signal of waveform F.

The $P_0(t)$ channel in FIGURE 6 operates the same way as the $P_3(t)$ channel except that a multiplier circuit is not required. Multiplying the received composite signal by the $P_0(t)$ waveform which is always unity, would leave the composite signal unchanged. Only the lowpass filter and emitter follower 78 is required to extract the lowpass information signal on the $P_0(t)$ channel, and reject all other components of the composite signal which will have frequencies on the order of $1/T$ cycles per second or higher.

To achieve the detection efficiency which is inherent in the orthonormal pulse multiplex transmisson system of the present invention, the receiving terminal must be closely synchronized to the composite signal from the transmitting terminal. A preferred method for achieving such synchronism is to transmit a constant reference signal on one of the orthonormal carrier signals as shown in FIGURE 8, and to derive automatic frequency control signals at the receiving terminal as shown in FIGURE 9.

In FIGURE 8, a typical circuit for the timer 2 is shown which consists of a conventional astable multivibrator. Its operating frequency is adpusted to $16/T$ cycles per second, and its output signal drives the orthonormal pulse waveform generator 1.

The $P_{15}(t)$ carrier waveform produced by orthonormal pulse waveform generator 1 is chosen as the carrier for the reference signal, because it contains frequency components only at odd harmonics of $8/T$ cycles per second. None of the lower order carriers contain these frequency components, as may be verified by Fourier analysis of the waveforms in FIGURE 2.

To provide a timing reference, the $P_{15}(t)$ carrier is transmitted during alternate periods of T seconds, and is not transmitted during the intervening periods of T seconds. Waveform B of FIGURE 10 illustrates the reference signal produced at the transmitting terminal. The reference signal is produced by alternately grounding and ungrounding the junction of resistors 99 and 100 by means of the diode switch 101. Since the $P_{15}(t)$ carrier maintains constant amplitude when it is transmitted, it also serves as an amplitude reference signal.

Diode switch 101 is controlled by bistable multivibrator 102 which is triggered at a $1/T$ cps. rate by synchronizing pulses from orthonormal pulse waveform generator 1. The output signals from bistable multivibrator 102 consist of a $1/2T$ cps. square wave shown as waveform A in FIGURE 10, and a like waveform of opposite polarity. When waveform A is positive, diode switch 101 presents a low impedance path from the junction of resistors 99 and 200 to ground.

Resistors 99 and 100 act as the summing resistor for the $P_{15}(t)$ reference channel. They connect the reference signal to the summing junction 68, where the reference signal is added to the modulated signals from the data channels. As in FIGURE 5, summing amplifier 54 and feedback resistor 72 provide a composite output signal at suitable voltage and impedance level.

In FIGURE 9, timer 17 is shown as an astable multivibrator similar to timer 2 of FIGURE 8 except that the common emitter terminal 103 is connected to a control voltage instead of to ground. The control voltage on terminal 103 varies the operating frequency of timer 17 above or below the nominal value of $16/T$ cycles per second, and is generated in the following way.

The receiver fine reference signal, shown as waveform C in FIGURE 10, is generated by bistable multivibrator 104 in response to synchronizing signals from timer 17. Since the astable multivibrator circuit comprising timer 17 is symmetrical, the positive-going signals at terminal 105 occur midway between those at terminal 106. The positive-going signals at terminal 105 occur at odd multiples of $T/32$, and are used to trigger bistable multivibrator 104. To assure proper polarity of its output signal, bistable multivibrator 104 is set to its $+1$ state at even multiples of $T/8$ by bistable multivibrator 29 in orthonormal pulse waveform generator 18. The receiver fine reference signal produced by bistable multivibrator 104 is equivalent to the $P_{16}(t)$ orthonormal pulse waveform which is the same as the $P_{15}(t)$ waveform except for a $90°$ shift in phase. The $P_{16}(t)$ waveform is orthonormal to all lower order carrier waveforms other than $P_{15}(t)$ for any phase angle of $P_{16}(t)$.

The fine reference signal from bistable multivibrator 104 is applied with both polarities to multiplier 107. The received composite signal from input amplifier 73 of FIGURE 6 is also applied with both polarities to multiplier 107. The product signal of multiplier 107 is illustrated by waveforms D and E in FIGURE 10 when waveform C exhibits a positive delay and a negative delay respectively, relative to the transmitter reference signal shown by waveform B. Since the components of the composite signal other than the transmitter reference signal contribute nothing to the average product signal, they have been omitted in waveforms D and E.

The average value of product signal waveform D or E is extracted by the lowpass filter and emitter follower 108 and is applied as a fine frequency control voltage to terminal 103 of timer 17. Waveform A of FIGURE 11 illustrates how the fine frequency control voltage varies with relative delay of the receiver timing. A positive delay up to $T/16$ seconds results in a positive control voltage, which when applied to timer 17 will increase the frequency of timer 17 slightly, reducing the delay toward zero. A negative delay up to $-T/16$ seconds results in a negative control voltage, which will decrease the frequency of timer 17 slightly, increasing the delay toward zero. The sawtooth variation in fine frequency control voltage as a function of delay repeats every $T/8$ seconds, so that stable null points occur at zero delay or at any multiple of $T/8$ seconds.

To resolve this ambiguity, a coarse frequency control voltage is generated and used in the following way: The receiver coarse reference signal shown as waveform I of FIGURE 10 is produced by bistable multivibrator 109, which is triggered by trigger pulses TP14, waveform F, from orthonormal pulse waveform generator 18. At the beginning of each period of T seconds, bistable multivibrator 109 is alternately set to $+1$ and $-1$ by the pulses shown as waveforms G and H respectively, which are derived from bistable multivibrator 110. Bistable multivibrator 110 is triggered repetitively by $1/T$ cps. synchronizing pulses from the orthonormal pulse waveform generator 18. It should be noted that the use of trigger pulses TP14 in generating the receiver coarse reference signal, in no way interferes with the use of the $P_{14}(t)$ channel for data transmission.

The receiver coarse reference signal is applied with both polarities to multiplier 111, as is the received composite signal. The product signal of multiplier 111 appears typically as waveform J or K of FIGURE 10 for a positive delay or negative delay respectively, of the receiver timing. Components of the composite signal other than the transmitter reference signal have been disregarded in waveforms J and K, because the other components contribute nothing to the average product if the receiver is synchronized to some multiple of $T/8$ seconds.

The average product signal is extracted by reset integrator 112 and is used as a coarse frequency control voltage. Waveform B of FIGURE 11 shows how the coarse frequency control voltage varies with relative delay in receiver timing. Since the receiver will already have been synchronized to the nearest multiple of $T/8$ by the fine frequency control circuits, the coarse frequency control voltage only at those values of delay is pertinent. Positive delay errors up to $T$ seconds produce a positive coarse frequency control voltage, and negative delay errors up to $-T$ seconds produce a negative coarse frequency control voltage. The sawtooth variation of waveform B, FIGURE 11, repeats every $2T$ seconds.

The coarse frequency control voltage from reset integrator 112 is applied to the Schmitt trigger circuits 113 and 114. As shown by waveform D of FIGURE 11, Schmitt trigger 113 operates to produce a fixed positive control voltage whenever the receiver delay lies between $-T/8$ and $-7T/8$ inclusive. In this situation, the diode gate 115 is enabled so that at the beginning of the next interval of $T$ seconds, monostable multivibrator 116 is triggered. Monostable multivibrator 116 discharges the negative voltage held in reset integrator 112 and causes diode gate 117 to be disabled for a period slightly longer than $T/8$ seconds. As a result, one of the $8/T$ cps. pulses from bistable multivibrator 29 is removed in diode gate 117 and never reaches the succeeding bistable multivibrator 30 in the orthonormal pulse waveform generator 18.

Waveform L of FIGURE 10 shows $8/T$ cps. pulses which normally trigger bistable multivibrator 30. Waveform M shows the output signal from monostable multivibrator 116 if a negative delay error exists, and waveform N shows the $8/T$ cps. trigger pulses with one pulse subtracted.

Subtracting a trigger pulse from bistable multivibrator 30 has the effect of shifting the receiver coarse reference signal, waveform I, positively by $T/8$ seconds. If a negative delay error still exists, another pulse is subtracted; and so on until a condition of zero delay is reached. When that condition is reached, Schmitt trigger 113 will not operate and bistable multivibrator 30 will be triggered in normal fashion thereafter.

If the receiver should exhibit a positive delay error between $+T/8$ and $+7T/8$ inclusive, Schmitt trigger circuit 114 will produce a positive control voltage as shown by waveform C of FIGURE 11. As a result, diode gate 118 will be enabled and at the beginning of the next interval of $T$ seconds, monostable multivibrator 119 will be triggered. Monostable multivibrator 119 discharges the positive voltage held in resent integrator 112, and slightly more than $T/8$ seconds later, supplies an extra trigger pulse to bistable multivibrator 30 through the diode combiner 120. Waveform M of FIGURE 10 shows the output signal from monostable multivibrator 119 if a positive delay error exists, and waveform O shows the trigger pulses supplied to bistable multivibrator 30 in this case.

Adding an extra trigger pulse to bistable multivibrator 30, causes the receiver coarse reference signal, waveform I, to be shifted negatively by $T/8$ seconds. If a positive delay error still exists, another trigger pulse is added; and so on until a delay error of zero is reached. The orthonormal pulse waveform generator 18 will then operate normally and in complete synchronism with the received composite signal.

Once synchronism has been achieved, an amplitude reference signal may be obtained in the following way. The $P_{15}(t)$ carrier from orthonormal pulse waveform generator 18, which is shown as waveform P in FIGURE 10, is applied with both polarities to multiplier 121, as is the received composite signal. Neglecting the data channel signals which will be orthonormal to $P_{15}(t)$, the product of the transmitter reference signal, waveform B, and the receiver $P_{15}(t)$ carrier, waveform P, will appear as in waveform Q. The average value of waveform Q is detected by the lowpass filter and emitter follower 122. The average value will be constant, and will be indicative of $a+1$ amplitude on the data channels. It may therefore be used as a positive amplitude reference. The inverting amplifier 123 and feedback network composed of equal resistors 124 and 125 may used to obtain a corresponding negative amplitude reference indicative of a $-1$ amplitude on the data channels.

It will be realized that the foregoing description is intended to be illustrative only, and is not to be taken in any way as limiting the scope of the present invention, which is defined solely by the appended claims.

We claim:

1. A multiplex channel intelligence communication system comprising in combination:
   (a) a transmitting station and a remotely located receiving station with a transmission link therebetween,
   (b) means at said transmitting station for generating a plurality of rectangular, overlapping, pulse waveforms bearing a mutually orthonormal relation to each other,
   (c) input circuits for intelligence signals,
   (d) means for multiplying said waveforms with said intelligence signals,
   (e) means for combining said multiplied waveforms by linear addition to obtain a composite signal for transmission along said transmission link,
   (f) means at said receiving station for deriving synchronizing signals from said composite signal when received at said receiving station,
   (g) means at said receiving station for generating a plurality of orthonormal pulse waveforms corresponding to those generated at the transmitting station,
   (h) means for correlating said composite signal with said orthonormal pulse waveform for each channel, and
   (i) output circuits for deriving the original intelligence signals from the correlation waveforms for each channel.

2. A system as set forth is claim 1 wherein said orthonormal pulse waveforms are comprised in a set of waveforms $P_n(t)$, having a common repetition period T, whose amplitudes at the beginning of the period T are equal to a normalized level $+1$, whose amplitudes alternate thereafter during the period T between the normalized levels of $-1$ and $+1$, whose number of alternations during the period T is equal to the waveform index number $n$, and whose alternations during the period T occur at times equal to odd multiples of $T/2^{K+1}$ when the waveform index number $n$ is exactly equal to $2^K$ or at a combination of times equal to odd multiples of $T/2^{K_1+1}$, $T/2^{K_2+1}$, etc. when the waveform index number $n$ is equal to $2^{K_1}+2^{K_2}+$ etc., as in conventional binary representation of numbers.

3. A system as set forth in claim 1 wherein at least some of said orthonormal pulse waveforms are permanently reversed in polarity.

4. A sytem as set forth in claim 1 wherein at least some of said orthonormal pulse waveforms are permanently rearranged in their index sequence.

5. A system as set forth in claim 1 wherein corresponding time segments of all of said orthonormal pulse waveforms are permanently rearranged.

6. A system as set forth in claim 1 wherein all of said orthonormal pulse waveforms are permanently reversed in polarity during at least some part of each repetition period T.

7. A system as set forth in claim 1 wherein said means for generating the plurality of orthonormal pulse waveforms comprises a square wave oscillator producing timing pulses at a rate of $2^K$ pulses per repetition period T; cascaded bistable multivibrators for deriving synchronizing pulses at rates $2^{K-1}$, $^{K-2}$, ... $2^0$ pulses per repetition period T; differentiating networks for deriving non-overlapping trigger pulses at rates of $2^{K-1}$, $2^{K-2}$, ... $2^0$ pulses per repetition period T; a diode matrix for combining said trigger pulses to produce a plurality of trigger pulse signals where the trigger pulses occur at the zero crossing times of the desired orthonormal pulse waveforms; and a plurality of bistable multivibratiors triggered by the signals from said diode matrix to produce the desired orthonormal pulse waveforms.

8. A system as set forth in claim 1 wherein said input circuits for intelligence signals include means for sampling said intelligence signals at a rate equal to or greater than twice the bandwich of said intelligence signals, and means for rendering said intelligence signals constant during the interval between sampling times, said interval between sampling times being equal to the repetition period T of said orthonormal pulse waveforms.

9. A system as set forth in claim 1 wherein said intelligence signals exhibit a plurality of bandwidths, said input circuits include means for sampling said intelligence signals at a plurality of rates, the lowest rate being equal to one sample per repetition period T and higher rates being equal to $2^L$ samples per repetition period T, where L is any positive integer, and means for rendering said intelligence signals constant during their respective interval between sampling times $T/2^L$, and the index numbers of said orthonormal pulse waveforms multiplied by said intelligence signals increase in steps equal to the factor $2^L$ when said intelligence signals are sampled at a rate equal to $2^L$ samples per repetition period T.

10. A system as set forth in claim 1 wherein one or more of said intelligence signals are rapidly changing electrical analog signals; said input circuits for each of these intelligence signals comprise a sample-and-hold circuit and a balanced amplifier providing equal but opposite polarity signals; said means for multiplying said intelligence signals by said orthonormal pulse waveforms comprises a bi-directional diode switch; said means for correlating said composite signal with said orthonormal pulse waveforms comprises another bi-directional diode switch multiplier and a reset integrator; and said output circuits comprise a sample-and-hold circuit, a lowpass filter, and an emitter follower.

11. A system as set forth in claim 1 wherein one or more of said intelligence signals are slowly changing electrical analog or digital signals; said input circuits for each of these channels comprises a balanced amplifier; said multiplier comprises a bi-directional diode switch; said correlation means comprises another bi-directional diode switch multiplier and a lowpass filter; and said output circuits comprise an emitter follower.

12. A system as set forth in claim 1 wherein one or more of said intelligence signals are slowly varying mechanical shaft rotations; said input circuits and multipliers for each of these channels comprise a potentiometer energized at its fixed terminals by equal but opposite polarity carrier waveforms; said correlation means comprises a bi-directional diode switch multiplier and lowpass filter; and said output circuits comprise a differential amplifier, servo motor, and feedback potentiometer.

13. A system as set forth in claim 1 wherein one or more of said intelligence signals are rapidly changing digital signals externally synchronized to one of the sampling rates of the multiplex system; said input circuits for each of these channels comprise a balanced amplifier; said multiplying means comprises a diode switch for setting the bistable multivibrator which products the carrier waveform for each channel to an initial state of $+1$ or $-1$ at the beginning of each repetition period T depending upon the ONE-ZERO state of the digital intelligence signal; said correlation means comprises a bi-directional diode switch multiplier and reset integrator; and said output circuits comprise a Schmitt trigger circuit, a diode sampling switch, and a bistable multivibrator.

14. A system as set forth in claim 1 wherein one of the orthonormal pulse waveforms is modulated by a repetitive signal to provide a timing and amplitude reference signal for the remaining intelligence channels.

15. A system as set forth in claim 14 wherein said reference signal at said transmitting station is produced by selecting one of the orthonormal pulse waveforms whose index number is an exact power of two and multiplying said selected waveform by a repetitive square wave signal, the amplitude of said square wave signal alternating between the normalized levels of $+1$ and 0 during successive repetition periods T of said orthonormal pulse waveforms.

16. A system as set forth in claim 15 wherein said means for synchronizing said receiving station comprises a timing oscillator and means for deriving from said timing oscillator two local reference signals displaced 90° in phase with respect to each other which have approximately the same frequentcy as said reference signal at said transmitting station, one of said local reference signals being designated as the 0° local reference signal and being used for the generation of said orthonormal pulse waveforms, and the other said local reference signals being designated as the 90° local reference signal, means for correlating said 90° local reference signal with the received composite signal to derive a frequency control voltage, and means for using said frequency control voltage to vary the frequency of said timing oscillator at said receiving station until said timing oscillator is brought into the desired frequency and phase relationship to the received composite signal.

17. A system as set forth in claim 16 wherein said means for synchronizing said receiving station further includes means for multiplying said 0° local reference signal with a constant amplitude square wave whose repetition period is equal to 2T and whose alternations between the normalized amplitudes of $+1$ and 0 occur at the midpoints of the repetition period T of said orthonormal pulse waveforms, means for correlating said multiplied 0° local reference signal with the received composite signal to derive a second frequency controll voltage; and means for using said control voltage to cause timing pulse to be added to or subtracted from the orthonormal pulse waveform generator at said receiving station until no timing error exists between said orthonormal pulse waveform generator and the received composite signal.

18. A system as set forth in claim 17 wherein an amplitude reference signal is derived at said receiving station by correlation of the received composite signal with said 0° local reference signal.

References Cited by the Examiner
UNITED STATES PATENTS

| | | | |
|---|---|---|---|
| 1,608,566 | 11/26 | Potter | 179—15 |
| 3,030,614 | 4/62 | Lehan et al. | 343—203 |

DAVID G. REDINBAUGH, *Primary Examiner.*

UNITED STATES PATENT OFFICE
CERTIFICATE OF CORRECTION

Patent No. 3,204,035            August 31, 1965

Arthur H. Ballard et al.

It is hereby certified that error appears in the above numbered patent requiring correction and that the said Letters Patent should read as corrected below.

Column 1, line 61, for "requires" read -- require --; column 2, line 59, for "a", second occurrence, read -- an --; column 3, line 6, for "mutiplex" read -- multiplex --; line 11, for "or" read -- of --; line 16, for "mutiplex" read -- multiplex --; column 5, line 24, strike out "the"; column 10, line 45, for "causng" read -- causing --; column 13, line 13, after "input" insert -- digital --; line 37, for "adpusted" read -- adjusted --; line 65, for "200" read -- 100 --; column 16, line 8, after "may" insert -- be --; line 47, after "level" insert -- of --; lines 58, 61, 64, 67 and 71, for the claim reference numeral "1", each occurrence, read -- 2 --; column 17, line 1, for "$k-2$" read -- $2^{k-2}$ --; line 8, for "multivibratiors" read -- multivibrators --; line 14, for "bandwich" read -- bandwidth --; line 19, for the claim reference numeral "1" read -- 2 --; column 18, line 1, for "products" read -- produces --; line 27, for "frequentcy" read -- frequency --; line 31, after "other" insert -- of --; line 49, for "controll" read -- control --; line 52, for "pulse" read -- pulses --.

Signed and sealed this 18th day of October 1966.

(SEAL)
Attest:

ERNEST W. SWIDER            EDWARD J. BRENNER
Attesting Officer            Commissioner of Patents